(12) United States Patent
Bluzer

(10) Patent No.: US 7,667,201 B2
(45) Date of Patent: Feb. 23, 2010

(54) SENSITIVE SILICON SENSOR AND TEST STRUCTURE FOR AN ULTRA-SENSITIVE SILICON SENSOR

(75) Inventor: Nathan Bluzer, Rockville, MD (US)

(73) Assignee: Northrop Grumman Corporation, Baltimore, MD (US)

(*) Notice: Subject to any disclaimer, the term of this patent is extended or adjusted under 35 U.S.C. 154(b) by 75 days.

(21) Appl. No.: 11/240,772

(22) Filed: Oct. 3, 2005

(65) Prior Publication Data

US 2006/0081781 A1 Apr. 20, 2006

Related U.S. Application Data

(60) Provisional application No. 60/614,971, filed on Oct. 4, 2004.

(51) Int. Cl.
*G01J 5/56* (2006.01)
(52) U.S. Cl. .................. 250/338.4; 250/338.1; 250/352
(58) Field of Classification Search .............. 250/338.4, 250/338.1, 352
See application file for complete search history.

(56) References Cited

U.S. PATENT DOCUMENTS

| | | | | |
|---|---|---|---|---|
| 3,791,217 A | * | 2/1974 | Stout et al. | ................... 374/167 |
| 4,333,058 A | * | 6/1982 | Hoover | ....................... 330/253 |
| 5,154,514 A | * | 10/1992 | Gambino et al. | ............. 374/178 |
| 5,539,381 A | | 7/1996 | Johnson | |
| 6,028,309 A | | 2/2000 | Parrish et al. | |
| 6,064,066 A | * | 5/2000 | Bevan et al. | ................. 250/345 |
| 6,133,572 A | | 10/2000 | Cunningham | |
| 6,441,372 B1 | * | 8/2002 | Kawahara | .................... 250/332 |
| 6,489,615 B2 | | 12/2002 | Bluzer | |
| 2001/0035559 A1 | * | 11/2001 | Ando et al. | .................. 257/443 |
| 2002/0150140 A1 | * | 10/2002 | Julicher et al. | .............. 374/120 |
| 2002/0175286 A1 | * | 11/2002 | Murguia | ................. 250/339.07 |

* cited by examiner

*Primary Examiner*—David P Porta
*Assistant Examiner*—Shun Lee
(74) *Attorney, Agent, or Firm*—Andrews Kurth LLP

(57) ABSTRACT

A thermal radiation sensor is disclosed wherein a semiconductor thermocouple comprised of a pair of silicon diodes is connected in back-to-back relationship, with one of the diodes being located in a detector stage. The other diode is located in a heat bath stage together with a sensed temperature difference amplifier. The detector stage is thermally isolated from the heat bath stage by a low thermal conductivity link that includes electrical wires which connect the back-to-back diodes to the amplifier.

16 Claims, 4 Drawing Sheets

US 7,667,201 B2
SENSITIVE SILICON SENSOR AND TEST STRUCTURE FOR AN ULTRA-SENSITIVE SILICON SENSOR

CLAIM OF PRIORITY

This application is a Non-Provisional application including the subject matter and claiming the priority date under 35 U.S.C. §119(e) of Provisional Application Ser. No. 60/614,971, filed Oct. 4, 2004, the contents of which are meant to be incorporated herein by reference.

RELATED APPLICATIONS

This application is related to Non-provisional application Ser. No. 11/239,275, (Northrop Grumman Ref. No. 000775-078) entitled "Focal Plane Antenna to Sensor Interface For An Ultra-Sensitive Silicon Sensor" filed on Sep. 30, 2005; Non-provisional application Ser. No. 11/239,297, (Northrop Grumman Ref.: No. 000776-078), entitled "Ultra-Sensitive Silicon Sensor Readout Circuitry" filed on Sep. 30, 2005; and Non-provisional application Ser. No. 11/240,471(Northrop Grumman Ref.: No. 000801-078), entitled "Low Noise Field Effect Transistor", filed on Oct. 3, 2005.

CROSS REFERENCE TO RELATED ART

This application is also related to U.S. Pat. No. 6,489,615 entitled "Ultra-Sensitive Silicon Sensor", granted to Nathan Bluzer, the present inventor, on Dec. 3, 2002, and assigned to the assignee of this invention. U.S. Pat. No. 6,489,615 is intended to be incorporated herein by reference for any and all purposes.

BACKGROUND OF THE INVENTION

1. Field of the Invention

This invention relates generally to radiation sensors and more particularly to bolometer type sensors for detecting thermal radiation.

2. Description of Related Art

Bolometers are well known in the art and comprise thermal devices which generate an electrical output when they are heated by the energy that they absorb. These devices have many applications and they are currently finding new applications, particularly in the field of infra-red (IR) imaging. Imaging in the long wave infra-red (LWIR) band of the electromagnetic spectrum has been achieved and efforts are currently under way to extend its capability to the millimeter wave (MM) and Terahertz (THz) spectral bands of the electromagnetic spectrum.

The inherent limitations in conventional bolometers has now been overcome with the use of semiconductor IR detector devices such as silicon diodes. In a related invention of the present applicant, a semiconductor thermocouple arrangement comprising a pair of back-to-back bolometer devices comprising silicon diodes as shown and described in U.S. Pat. No. 6,489,615 entitled "Ultra-sensitive Silicon Sensor", dated Dec. 3, 2002, the contents of which are intended to be incorporated herein by reference, are respectively located in a detector stage and an intermediate stage, the latter being located between the detector stage and a heat bath stage. This type of sensor achieves maximum thermal isolation between the silicon diode temperature detectors and the outside world. Thermal isolation is achieved by using electro-thermal feedback which is provided by the heat generated by an amplifier physically located in the intermediate stage and which generates heat which is proportioned to the difference between the temperatures detected by the silicon diodes respectively located in the detector stage and the intermediate stage. The heat generated by the amplifier zeroes the temperature difference between the detector stage and the intermediate stage, and thereby zeroes any net heat flowing between the detector stage and the intermediate stage, thus enhancing the sensitivity of the diode sensors to thermal radiation.

SUMMARY

It is an object of the present invention to provide a thermal radiation sensor which does not utilize electro-thermal feedback in an intermediate stage of a three tier sensor for achieving thermal isolation between the detector stage and the heat bath stage.

The present invention is directed to a relatively simple sensor structure which permits a smaller pixel footprint relative to an ultra-sensitive silicon sensor described in the above-referenced related art and also provides a means for testing the functionality of an ultra-sensitive silicon sensor pixel without active thermal isolation.

Accordingly, a sensor of thermal radiation is provided in accordance with the subject invention by a semiconductor thermocouple structure comprised of a pair of semiconductor diodes connected in back-to-back circuit relationship with one of the diodes being located in a detector stage, while the other diode is located in a heat bath stage together with a voltage amplifier providing an output signal proportional to the temperature difference between the sensor diodes and where the detector stage is thermally isolated from the heat bath stage by at least one low thermal conductivity link that includes electrical wires which connect the back-to-back diodes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following detailed description of the invention will be more readily understood when considered together with the accompanying drawings wherein.

DETAILED DESCRIPTION OF THE INVENTION

Figure 1:
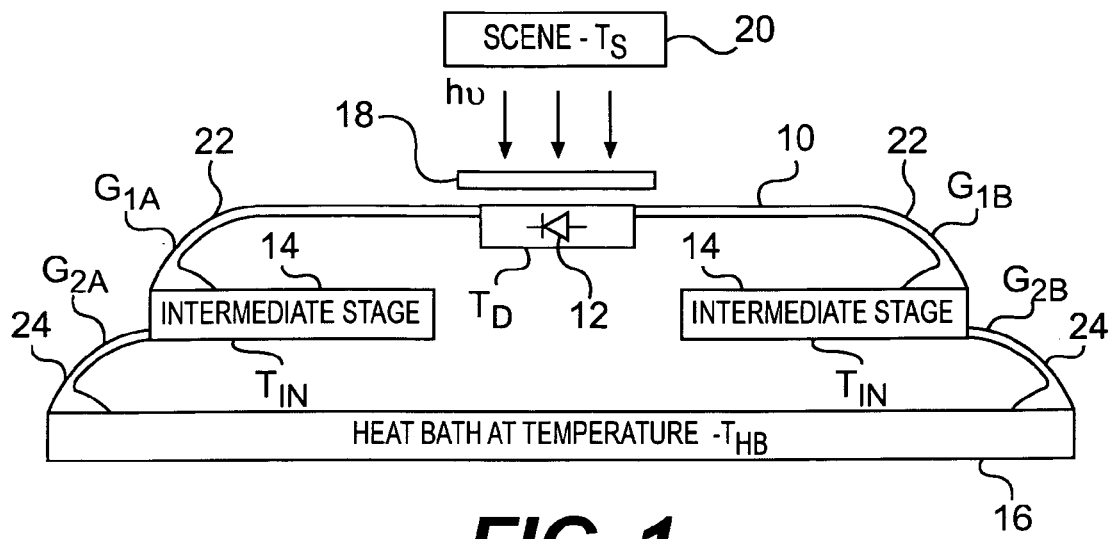
FIG. 1 is a diagram illustrative of a three-tier ultra-sensitive silicon sensor of thermal radiation in accordance with known related art and having an intermediate stage located between a detector stage and a heat bath stage.
Figure 2:
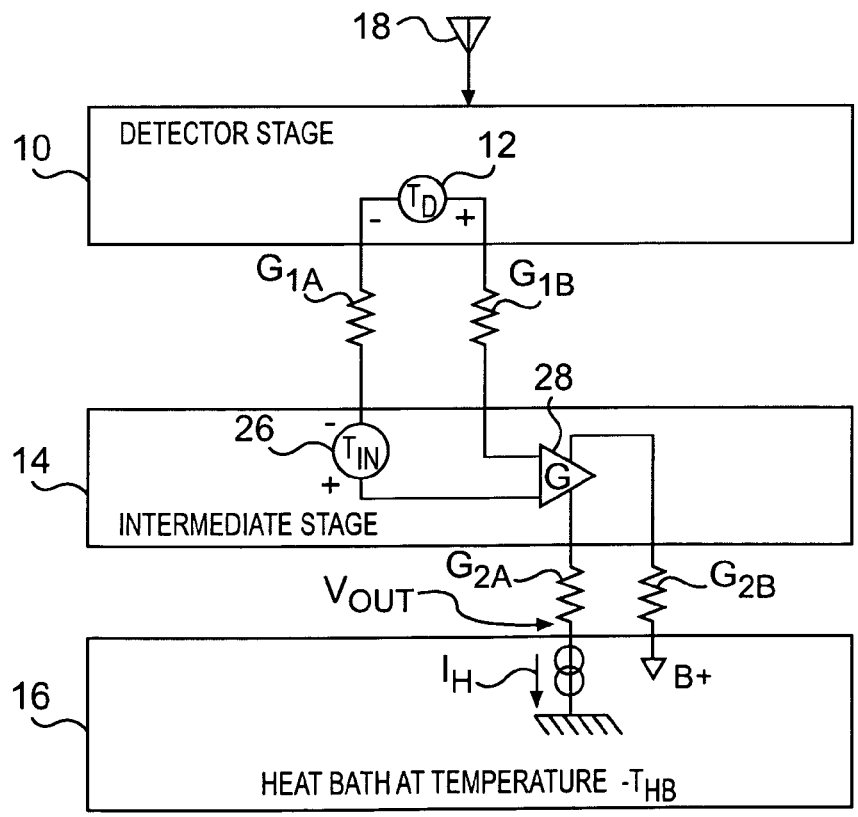
FIG. 2 is an electrical schematic diagram illustrative of the sensor shown in FIG. 1.

Referring now to the drawings wherein like reference numerals refer to like components throughout, reference is first made to FIG. 1 which is illustrative of a bolometer type sensor in accordance with the related art shown and described, for example, in the above referenced U.S. Pat. No. 6,489,615, and which is intended to depict an "ultra-sensitive" sensor for detecting thermal radiation and including an intermediate stage for thermally isolating the temperature sensing element located on the detector stage from a heat bath in the substrate. FIG. 2 is an electrical schematic drawing of the structure shown in FIG. 1 and is intended to illustrate the inclusion of an electro-thermal feedback circuit within the intermediate stage for reducing the thermal conductivity between the temperature sensing element in the detector stage and the heat bath stage by causing the temperature of the intermediate stage to converge to the temperature of the detector stage when detecting thermal radiation, thus effectively causing the thermal isolation members' conduction to attain a minimum conductive value and thereby improve the sensitivity of the sensor to thermal radiation.

Thermal isolation between the detector stage and the outside world is also provided by AC coupling the signals from lens or antenna to the detector stage. AC coupling minimizes the loading and thereby maintains the required thermal isolation to electrode thermal feedback. Efficient coupling is provided between the detector stage and the antenna by means of inductive or capacitive AC coupling, not shown.

In FIG. 1, reference numeral 10 denotes a detector stage at temperature $T_d$ (detector stage) including a temperature sensing element 12. An intermediate stage 14 in the form of an annular structure and having a temperature $T_{in}$ (intermediate temperature) surrounds the detector stage 10. Below the intermediate stage 14 is a heat bath stage 16 consisting of a substrate including a heat bath having a temperature $T_{hb}$. (heat bath) A generally flat antenna element 18 is located above and thermally isolated from the detector stage 10 for receiving radiation hv from an external scene 20 having a temperature $T_s$. (scene temperature)

What is significant to note with respect to the embodiment shown in FIG. 1 is a pair of annular support links 22 and 24 which separate the detector stage 10, the intermediate stage 14, and the heat bath stage 16. The support links 22 and 24 respectively provide conductance paths $G_1$ and $G_2$ and which is shown in FIG. 2 as pairs of conductances, i.e. $G_1=G_{1a}$ and $G_{1b}$ and $G_2=G_{2a}$ and $G_{2b}$.

Referring now to FIG. 2, the temperature sensing element 12 comprises a two terminal semiconductor device, preferably a silicon diode, which is connected back-to-back with a second two terminal temperature elements 26, also comprising a silicon diode, but which is located in the intermediate stage 14. Each diode 12 and 26 forms a semiconductor thermocouple. As shown in FIG. 2, the temperature sensing diodes 12 and 26 are connected together via their (−) terminals by means of a conductance $G_{1a}$. Their opposite (+) terminals are connected to a signal amplifier 28 located in the intermediate stage 14. The temperature sensing diode 26 is directly connected to the amplifier 28 while the temperature sensor 12 is connected to the amplifier by the conductance $G_{1b}$. The amplifier 28 is connected to a B+ supply voltage via a conductance $G_{2b}$ and biased by a current generator the amplifier 28 is returned to ground via the conductance $G_{2a}$. and biased by a current generator $I_H$ returned to ground via the conductance $G_{2a}$.

Figure 3:
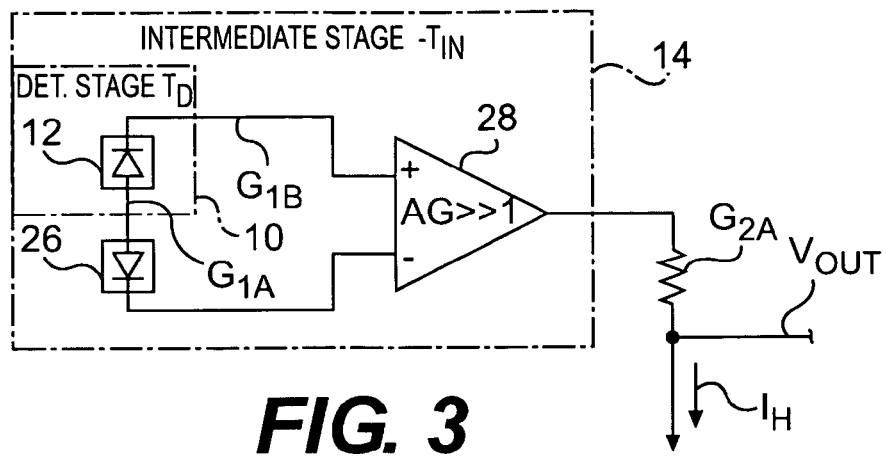
FIG. 3 is a partial electrical schematic diagram further illustrative of the schematic diagram shown in FIG. 2.

This arrangement is further shown in FIG. 3 where the temperature sensing element 26, shown as a semiconductor diode, and the amplifier 28 are both located in the intermediate stage 14, while the temperature sensing element 12, also shown as a semiconductor diode, is located in the detector stage 10. Furthermore, the temperature sensing diodes 12 and 26 are shown connected in back-to-back relationship via conductance $G_{1A}$ with the diode 12 being connected to the + input terminal of amplifier 28 via conductance $G_{1b}$, while the opposite terminal of diode 26 is directly connected to the (−) input terminal of amplifier 28.

The amplifier 28 operates to amplify the net voltage difference between the voltages generated by the diodes 12 and 26. What is most important, however, is that the heat generated by the amplifier stage 28 itself is used to directly heat the intermediate stage 14 in response to the temperature difference between the diodes 12 and 26 and thus acts as a heater in a thermal feedback loop to equalize the temperature of the detector stage with the intermediate stage 14.

Figure 4:
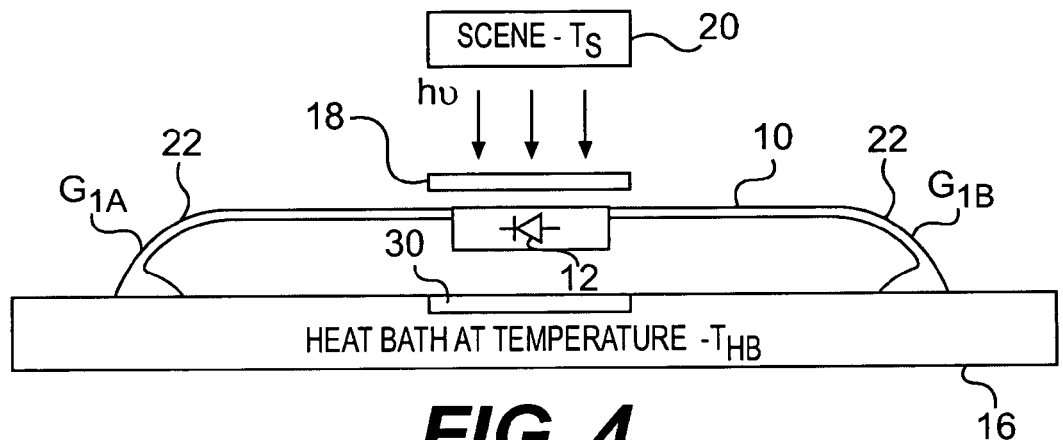
FIG. 4 is a diagram illustrative of a thermal radiation sensor in accordance with the subject invention.
Figure 5:
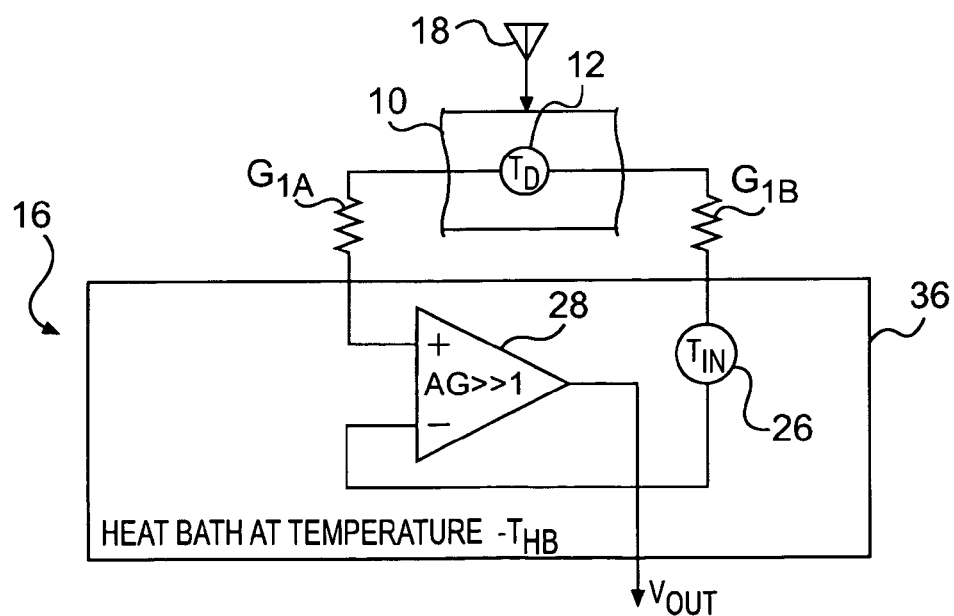
FIG. 5 is an electrical schematic diagram illustrative of the sensor shown in FIG. 4.
Figure 6:
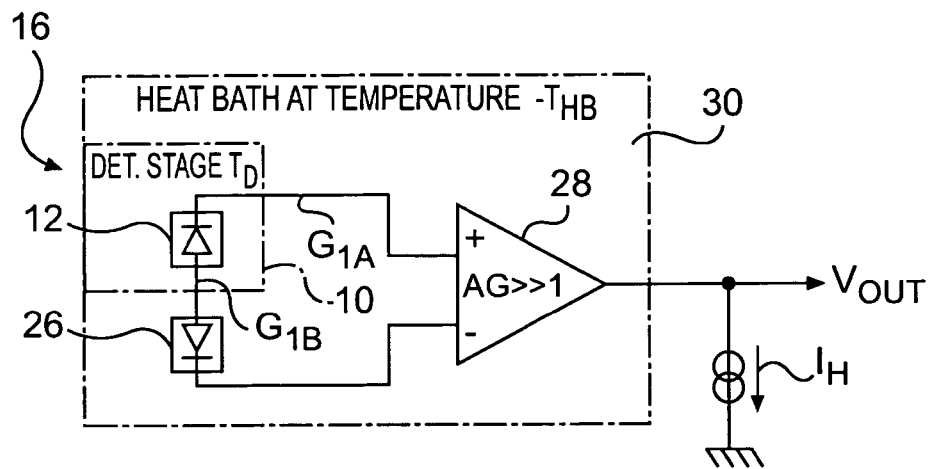
FIG. 6 is a partial electrical schematic diagram further illustrative of the sensor shown in FIG. 4.

Referring now to FIGS. 4, 5 and 6, shown thereat is an embodiment of the present invention wherein the intermediate stage's temperature sensor element 26 and the temperature difference amplifier 28 are made part of, or at least in thermal contact with, the heat bath stage 16. As shown in FIGS. 4 and 5, the detector stage 10 including the temperature sensing element 12 is located above the heat bath stage 16 by means of thermal isolation support member 22 which not only acts as a bridge for the detector stage 10, but also provides a low thermal conductance paths $G_{1A}$ and $G_{1B}$, including electrical wiring for connecting one side of the temperature sensing element 12 to one (+) terminal of amplifier 28 via $G_{1A}$ and for connecting $G_{1B}$ to the other side of the temperature sensing element 12 to the temperature sensing element 26 in back-to-back circuit relationship and which is then connected to the other (−) terminal of amplifier 28 as shown in FIG. 6, and where the temperature sensing elements are shown as diodes and more particularly p-n junction silicon diodes. Reference numeral 30 in FIGS. 5 and 6 denotes a section of the heat bath stage 16 wherein the amplifier 28 and the sensor diode 26 are located.

The embodiment of the invention shown in FIGS. 4-6 discloses a bolometer pixel which is a simplified version of the pixel structure shown in FIGS. 1, 2 and 3. However, it permits not only a smaller footprint, but provides a means for testing the functionality of an ultra-sensitive silicon sensor pixel as shown, for example, in U.S. Pat. No. 6,489,615 when combined in a common structure, such as an array. The silicon sensor of the present invention, moreover, provides for a minimum noise bandwidth unlike conventional bolometers that employ pulsed current bias of the thermal radiation absorber.

Figure 7:
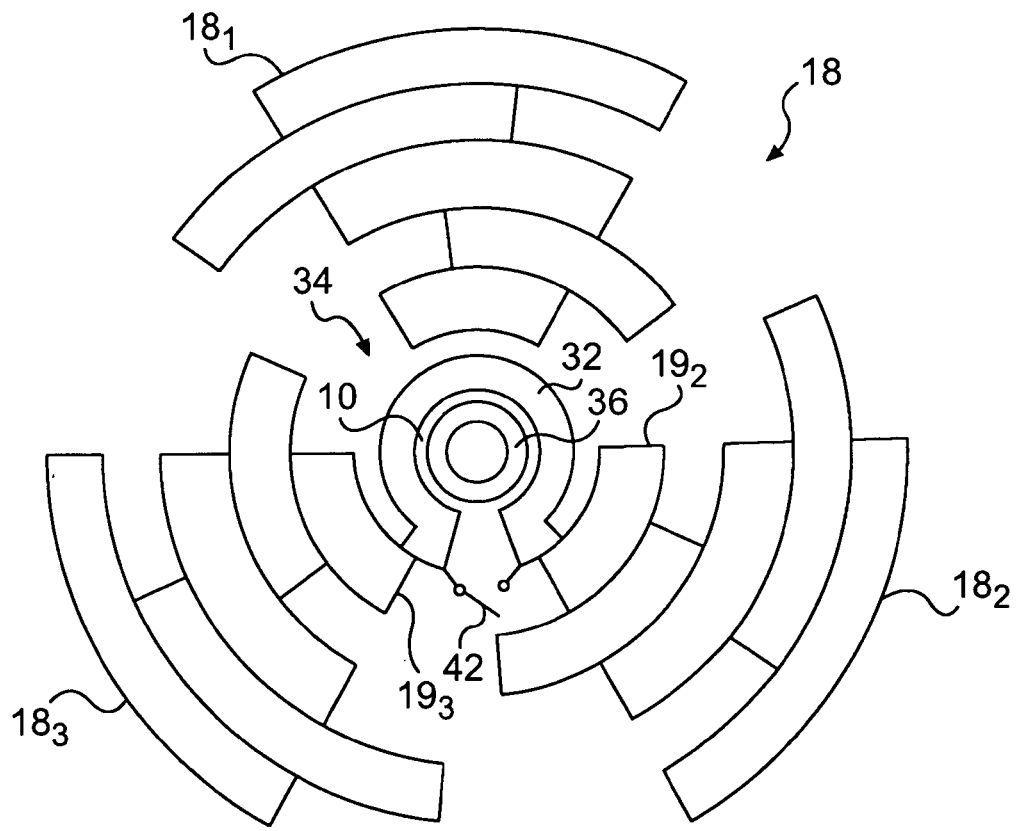
FIG. 7 is a top plan view illustrative of an antenna structure utilized in connection with the embodiment shown in FIG. 4.
Figure 8:
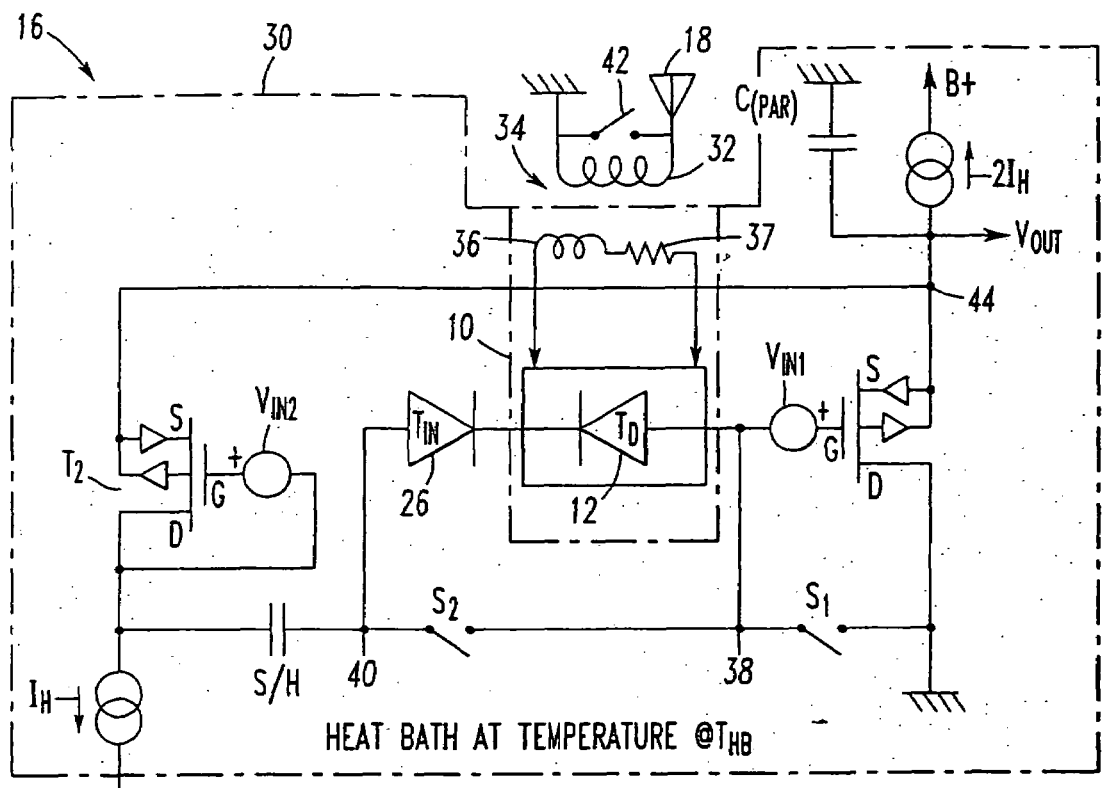
FIG. 8 is an electrical schematic diagram illustrative of a first embodiment of the subject invention.
Figure 9:
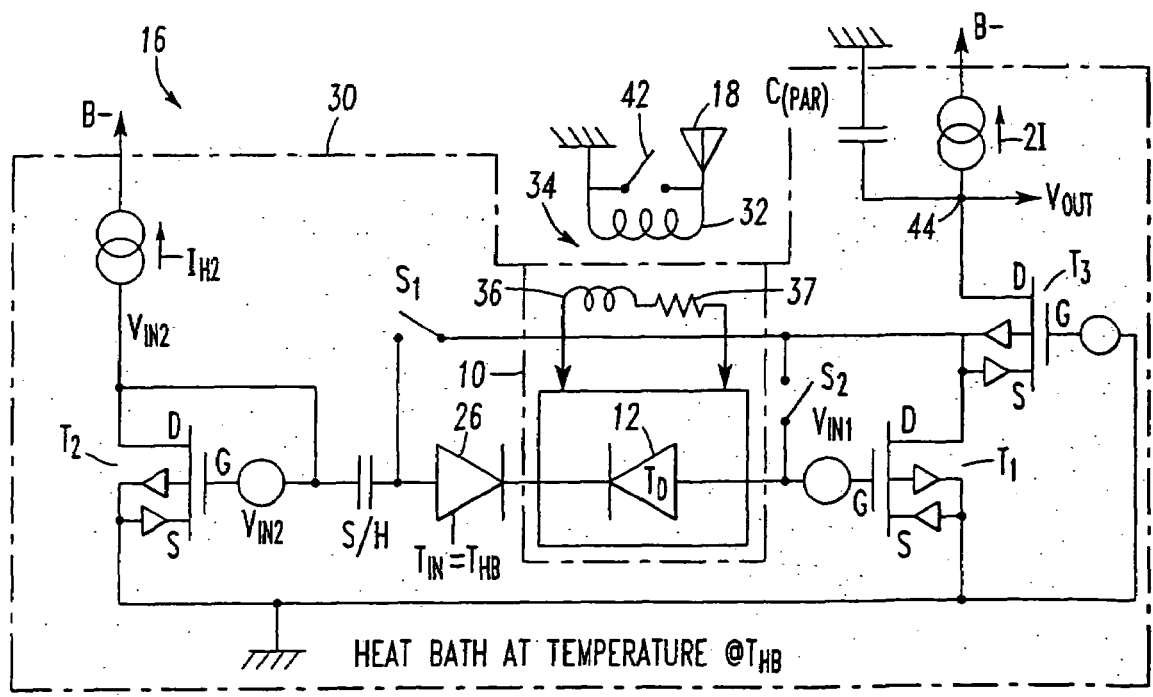
FIG. 9 is an electrical schematic diagram illustrative of a second embodiment of the subject invention.

Referring now to FIGS. 7, 8 and 9, FIG. 7 is directed to an antenna structure which is desirable for use in connection with the subject invention and more particularly to the embodiments of the invention shown in FIGS. 8 and 9. In FIG. 7, a complimentary toothed log periodic antenna which may be, for example, a microantenna, is shown by reference numeral 18. The antenna is shown inductively coupled and being comprised of three elements $18_1$, $18_2$, and $18_3$. The inner segments of $19_2$ and $19_3$ of antenna elements $18_2$, $18_3$ are connected to each end of a primary winding portion 32 of a transformer 34 shown in FIGS. 8 and 9. The primary winding 32 inductively couples an antenna signal into a secondary winding portion 36 having an internal electrical resistance, shown as a resistor 37, which acts as a thermal absorber element located on and thermally in contact with the detector stage 10 and is collocated with and operates to heat the temperature sensing element 12 shown in FIGS. 8 and 9 comprising a semiconductor (silicon) diode. Although not shown, the antenna can be capacitively AC coupled to a thermal absorber element when desired. Also, an equivalent structure such as a microlens, not shown, may be substituted for a microantenna.

FIGS. 8 and 9 disclose two embodiments of circuitry for the amplifier 28. The amplifier circuitry 28 in FIG. 8 includes a pair of P-channel field effect transistors (FETs) $T_1$ and $T_2$ connected to each end of the back-to-back temperature sensing diodes 12 and 26 and where the gate G of FET $T_1$ is coupled to silicon diode 12, while the source S and gate G of FET $T_2$ respectively couple the source follower output of $T_1$ to the silicon diode 26. Gain is achieved in $T_1$ because the signal from diodes 26 and 12 is applied between the gate G and source S electrodes instead of only to the gate G electrode. A pair of voltage sources $V_{in1}$ and $V_{in2}$ are shown coupled to the gate of FET 1 and FET 2, respectively. These sources include internal low frequency 1/f noise and threshold voltages of $T_1$ and $T_2$.

FIGS. 8 and 9 also disclose a sample and hold capacitor S/H and a pair of switches $S_1$ and $S_2$ connected between the back-to-back diodes 12 and 26 and the amplifier circuitry 28 to record and cancel the low frequency 1/f noise and the DC threshold offset voltages of the FETs used in the amplifier circuitry. The switches $S_1$ and $S_2$ when closed are used for recording the offset voltage on the capacitor S/H. The recorded voltage on capacitor S/H is updated at the beginning of every pixel time by closing the switches $S_1$ and $S_2$.

The circuitry of FIG. 8 discloses the sample and hold capacitor S/H connected between the diode 26 and the common connection of the drain D and gate G of transistor $T_2$. A pair of electrical switches $S_1$ and $S_2$ are shown with switch $S_1$ being connected between circuit node 38 and ground potential which is also common to the drain D of FET $T_1$, while switch $S_2$ is connected between circuit nodes 38 and 40 across the diodes 12 and 26.

In addition to a $2I_H$ current generator being connected to the sources S of both FETs $T_1$ and $T_2$, a second current generator $I_H$ is connected between a source of B– voltage potential and the commonly connected drain D and gate G of $T_2$, so that equal DC current flows through both FETs $T_1$ and $T_2$. This is accomplished by adjusting the value of the second generator $I_H$ to be one half of the source current generator $2I_H$. With equal current flow, the DC voltage stored on the capacitor S/H is minimized. With minimum DC voltage stored on the capacitor S/H, the impact of DC offset relative to the l/f noise and threshold offset threshold voltage variations is minimized in the output voltage V(out) appearing at the output signal node 44.

During the recording of the DC threshold offsets and 1/f noise on capacitor S/H, the antenna 18 is switched off with the closing of an electronic switch 42 connected across the primary winding 32 of transformer 34. Once the voltage has been recorded, the antenna switch 42 is again opened so that radiation signals can be received by the sensor diode 12. The switches $S_1$ and $S_2$ are simultaneously opened and a thermocouple temperature difference signal across the diodes 12 and 26 is applied in $T_1$ and $T_2$ which appears amplified at circuit node 44, which is the common connection of the source S terminals of $T_1$ and $T_2$.

An advantage of the source follower circuit configuration shown in FIG. 8 is that the source follower FET $T_1$ presents a high input impedance that minimizes the loading of the thermocouple signal generated across the detector diodes 12 and 26. A typical voltage gain of about 100× can be achieved and is limited primarily by the parasitic capacitance between the input gate of FET $T_1$ and ground. With a sensitivity of about –1 mV/K, an expected output would be 0.1 V/K. If a bias voltage of, for example 10 volts, were to be applied, the dynamic range would be greater than 100K changes in scene temperatures. The scene temperature, however, is normally attenuated by thermal loading on the detector stage 10.

A modification of the circuitry shown in FIG. 8 which provides improved noise immunity and higher output signal levels, is shown in FIG. 9. There a third P-channel FET $T_3$ is connected in cascode relationship with FET $T_1$ and in effect provides an inverting amplifier in the temperature measurement circuitry.

Referring now to FIG. 9, two equal current generators $I_{H1}$ and $I_{H2}$ are respectively coupled to the cascode amplifier circuit of $T_1$ and $T_3$ and the single stage transistor $T_2$ so as to substantially equalize the DC voltage across the capacitor S/H. As in the case of the circuit shown in FIG. 8, it is important to achieve extremely small offset voltage across the capacitor S/H. Recording of the low frequency 1/f noise and threshold offset voltages is also provided by a pair of switches $S_1$ and $S_2$ as in the circuitry of FIG. 8; however, switch $S_1$ is now connected between the capacitor S/H, diode 26 and the commonly connected drain D and source S of $T_1$ and $T_3$, while $S_2$ is connected between the gate G of $T_1$ and diode 12. The source S of FETs $T_1$ and $T_2$ are connected to ground. When the two switches $S_1$ and $S_2$ are closed at the beginning of a temperature measurement period, the operation of the cascode stage is temporarily curtailed and both FETs $T_1$ and $T_2$ operates in the triode mode. During normal operation, $S_1$ and $S_2$ are open and the cascode stage eliminates the Miller capacitance and the corresponding loading of the gate to drain capacitance on the gate G of $T_1$. The capacitance at the gate input capacitance on the gate G of $T_1$. The capacitance at the gate input node of $T_1$ is minimized to reduce signal attenuation from loading on the diode temperature sensors 12 and 26. The thermocouple diodes 12 and 26 have a small capacitance and are not capable of driving any significant load. However, a voltage gain of about 5K at low frequencies is nevertheless obtainable with the embodiment shown in FIG. 9. This is substantially more than the embodiment shown in FIG. 8.

Thus what has been shown and described is a silicon sensor of thermal radiation in the form of a pixel in which one of the thermocouple diodes and the temperature difference amplifier is located in heat bath stage as opposed to an intermediate stage and therefore is relatively simple and easy to fabricate as well as being relatively small size and also can be used in conjunction with a pixel shown and described in U.S. Pat. No. 6,489,615.

The invention being thus described, it will be obvious that the same may be varied in many ways. Such variations are not to be regarded as a departure from the spirit and scope of the invention, and all such modifications as will be obvious to one skilled in the art are intended to be included within the scope of the following claims.

The invention claimed is:

1. A pixel comprising:
    a radiation detection sub-assembly;
    a first thermally responsive temperature sensing element, wherein the first thermally responsive temperature sensing element includes a first Schottky diode thermally isolated from a composite heat bath stage;
    a thermal absorber element, wherein the thermal absorber element is co-located with the first thermally responsive temperature sensing element in the radiation detection sub-assembly and in thermal contact with the radiation detection sub-assembly, wherein said radiation detection sub-assembly, said first temperature sensing element, and said thermal absorber element form a composite detector stage;

means for AC coupling energy from radiation received from an external source to the composite detector stage, wherein the coupling means generates a signal from the radiation and is coupled to the first thermally responsive temperature sensing element via thermal absorber element and wherein the thermal absorber element receives the generated signal and heats the first thermally responsive temperature sensing element;

a heat bath sub-assembly;

a second thermally responsive temperature sensing element co-located with and in thermal contact with said heat bath sub-assembly, wherein the second thermally responsive temperature sensing element includes a second Schottky diode, for sensing inside the pixel the temperature of the heat bath sub-assembly, which is electronically connected to the first Schottky diode;

a temperature difference signal amplifier co-located with and in thermal contact with said heat bath sub-assembly, wherein said temperature difference signal amplifier is electrically connected to the first Schottky diode and the second Schottky diode, and amplifies a net voltage difference between voltages generated by the first Schottky diode and the second Schottky diode;

wherein said heat bath sub-assembly, said second temperature sensing element, and said temperature difference signal amplifier form the composite heat bath stage; and a passive thermal isolation support located between the composite detector stage and the heat bath stage and directly connected to said radiation detection sub-assembly and said heat bath sub-assembly, wherein the passive thermal isolation support thermal conductivity is not actively controlled and the electromagnetic radiation sensor assembly is a two stage sensor assembly wherein the two stages are the composite detector stage and the heat bath stage.

2. A pixel according to claim 1 wherein said Schottky diodes are connected in a series circuit relationship.

3. A pixel according to claim 1 wherein said Schottky diodes are connected in a back-to-back circuit relationship.

4. A pixel according to claim 1 wherein said thermal isolation support comprises at least two low thermal conductance bridge member for supporting the detector stage on the heat bath stage.

5. A pixel according to claim 4 wherein said coupling means comprises a thermal radiation antenna located adjacent the detector stage and being inductively or capacitively coupled to said first temperature sensing element.

6. A pixel according to claim 5 wherein the coupling means includes a transformer coupling incident radiant energy from said antenna to said detector stage.

7. A pixel according to claim 6 and additionally including a switch connected across a primary winding of said transformer connected to said antenna for periodically switching the antenna OFF when recording the DC threshold offsets and the 1/f noise voltage.

8. A pixel according to claim 4 wherein said first and second Schottky diodes are connected in back-to-back circuit relationship to said temperature difference signal amplifier.

9. A pixel according to claim 8 wherein said temperature signal amplifier is coupled to each end of said back-to-back Schottky diodes.

10. A pixel according to claim 9 and additionally including a capacitor and switch connected between the back-to-back Schottky diodes and the temperature signal amplifier for periodically recording and canceling 1/f noise and DC threshold offset voltages.

11. A pixel according to claim 9 wherein said signal amplifier devices are comprised of transistors.

12. A pixel according to claim 11 wherein the transistors are coupled as non-inverting amplifiers to each end of said back-to-back Schottky diodes.

13. A pixel according to claim 11 wherein the transistors are coupled as inverting amplifiers to each end of said back-to-back Schottky diodes, and additionally including a third transistor connected in cascade circuit relationship with one of said pair of said transistors coupled to one end of said back-to-back Schottky diodes.

14. A pixel according to claim 1 wherein said coupling means comprises a microantenna or a microlens.

15. A pixel according to claim 1 wherein said coupling means comprises a complementary toothed log periodic antenna.

16. A sensor array comprising a plurality of pixels according to claim 1.

* * * * *